(12) United States Patent
Hiraoka et al.

(10) Patent No.: US 6,255,235 B1
(45) Date of Patent: Jul. 3, 2001

(54) NONSLIP MEMBER AND MANUFACTURING METHOD OF NONSLIP MEMBER

(75) Inventors: Keiji Hiraoka; Tomohiro Hayashi; Masanobu Inohara, all of Kobe (JP)

(73) Assignee: ASICS Corporation, Kobe (JP)

( * ) Notice: Subject to any disclaimer, the term of this patent is extended or adjusted under 35 U.S.C. 154(b) by 0 days.

(21) Appl. No.: 09/270,907

(22) Filed: Mar. 15, 1999

(30) Foreign Application Priority Data

Nov. 24, 1998 (JP) .................................................. 10-332871

(51) Int. Cl.⁷ .......................... B32B 27/04; B32B 24/12; A41D 19/00; B05D 5/08
(52) U.S. Cl. .......................... 442/101; 427/288; 428/189; 428/190 W; 428/198; 2/161.3; 524/571; 36/59 A; 36/59 R
(58) Field of Search .............................. 924/571; 36/59 A, 36/59 R; 428/189, 190 W, 198; 2/161.3; 427/288; 442/101

(56) References Cited

U.S. PATENT DOCUMENTS

| | | | |
|---|---|---|---|
| 3,649,967 | * 3/1972 | Millman | .............................. 2/161.3 |
| 4,229,333 | * 10/1980 | Wolff et al. | . |
| 4,728,538 | * 3/1988 | Kasper et al. | ........................ 427/288 |
| 4,882,378 | * 11/1989 | Himes | . |
| 5,836,091 | * 11/1998 | Cook | . |
| 6,032,388 | * 3/2000 | Fram | . |

\* cited by examiner

*Primary Examiner*—Peter Szekely
(74) *Attorney, Agent, or Firm*—Michael Zall

(57) ABSTRACT

A nonslip member in which a large number of nonslip convexes are fixed to an upper surface of a base fabric performing an anchoring action, and the nonslip convexes are made of rubber. By engaging a male mold and a female mold with each other, a large number of small pieces coincident to a shape of through holes of the female mold are punched out from a plate-like material. By pressurizing and heating each small piece between a punching convex and a mounting base while engaging the male mold and the female mold with each other, the small piece is bridged and fixed to the base fabric to serve as a nonslip convex.

3 Claims, 10 Drawing Sheets

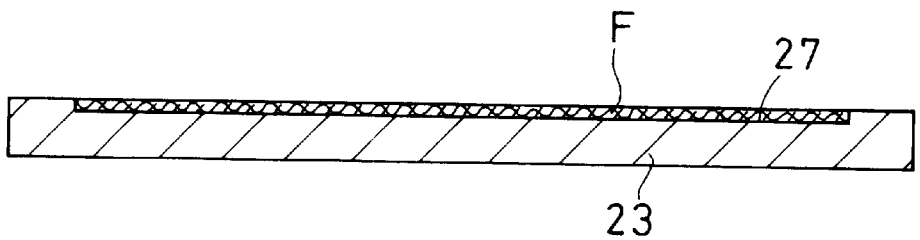
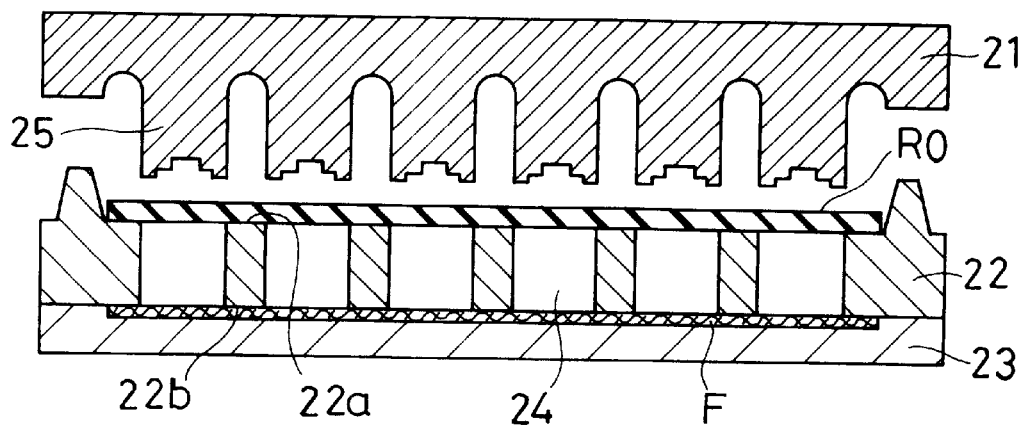
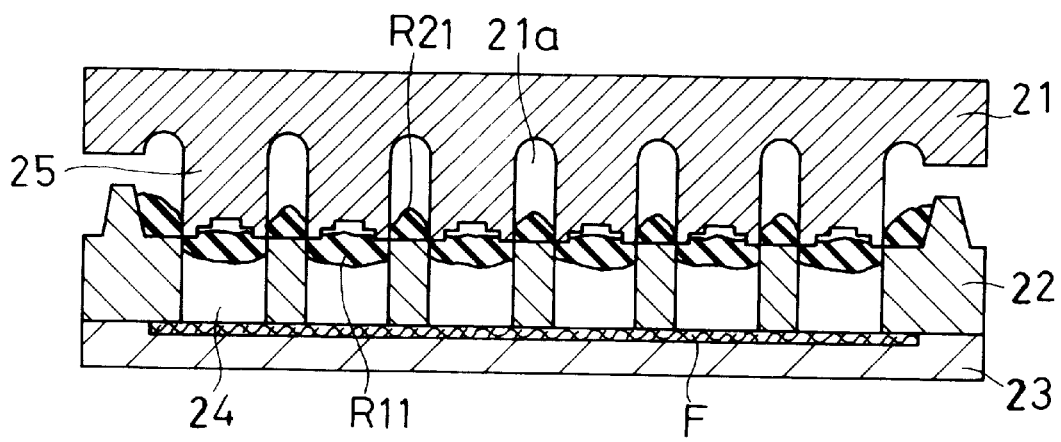

PRIOR ART

NONSLIP MEMBER AND MANUFACTURING METHOD OF NONSLIP MEMBER

BACKGROUND OF THE INVENTION

1. Field of the Invention

The present invention relates to a nonslip member capable of being used as an outsole of shoe and to a manufacturing method of the nonslip member.

2. Prior Art

Hitherto, a nonslip member in which a nonslip convex of polyurethane elastomer is fixed to a soft base fabric such as nonwoven fabric has been known (see, for example, the Japanese Laid-Open Patent Publication (unexamined) Hei 6-826 and the Japanese Laid-Open Patent Publication (unexamined) Hei 6-296502). By using the base fabric, when used as an outsole, such a nonslip member exhibits characteristics of light weight and easy bending, and moreover has various advantages such as freedom in design, improvement in adhesive property to midsole, etc.

An example of conventional manufacturing method of the nonslip member is hereinafter described.

FIG. 9 shows the conventional manufacturing method disclosed in the Japanese Laid-Open Patent Publication (unexamined) Hei 6-826, and in which FIG. 9(a) is a perspective view showing an injection step of urethane resin, FIG. 9(b) is a perspective view showing a squeezing step, FIG. 9(c) is a perspective view showing a heating step, and FIG. 9(d) is a perspective view showing a nonslip member.

As shown in FIG. 9(a), a polyurethane resin U is supplied to a metallic mold 100. Then, as shown in FIG. 9(b), after squeezing an excessive portion of the polyurethane resin U overflowing on the surface of the metallic mold 100 with a jig 101, the polyurethane resin U is heated and aged at 100° C. for 5 to 15 minutes. Subsequently, as shown in FIG. 9(c), a nonwoven fabric F is placed on the metallic mold 100, a holding plate 102 is further placed thereon, and they are held from above and under for closing, then polyurethane resin U is heated again at 120° C. for 30 to 40 minutes and hardened. Thereafter, the polyurethane resin U is released from the metallic mold and heated at 90° C. for a long time, then cooled, whereby a nonslip member (outsole) shown in FIG. 9(d) is obtained. Thus, in this prior art, by "squeezing" the resin U overflowing on the surface of the metallic mold 100, the surface of the nonwoven fabric is prevented from being stuck by the excessive portion of polyurethane resin U so as not to affect the softness and light weight of the nonwoven fabric F.

However, since the polyurethane elastomer is used in the prior art, the step called "squeezing" is essential as mentioned above, and therefore a problem exists in that manufacturing efficiency is lowered. Moreover, a skill is required in the "squeezing" step.

Now, another conventional manufacturing method of the nonslip member is hereinafter described.

FIGS. 10(a), (b), (c), (d) and (e) are sectional views showing the conventional manufacturing method in order of the steps thereof disclosed in the Japanese Laid-Open Patent Publication (unexamined) Hei 6-296502.

To manufacture the nonslip member according to this prior art, first as shown in FIG. 10(a), a blank sheet S is inserted between an upper punch die 211 on which a predetermined shape of concave 213 is formed and a lower punch die 212 on which a predetermined shape of convex 221 is formed. Then, by the frictional force between the concave 213 and a convex 221, a small piece 230 is punched out from the blank sheet S. After the punching, by disengaging the dies 211 and 212 as shown in FIG. 10(c), a base 226 on which a base fabric F is placed is disposed under the upper punch die 211 shown in FIG. 10(d). Then, as shown in FIG. 10(e), by moving the upper punch die 211 and the base 226 close to each other, the base fabric F is held therebetween, and by moving a press rod 214 downward, the small piece 230 remaining in the concave 213 is extruded out of the concave 213 to be pressed on the base fabric F.

Thus, in this prior art, it is necessary to operate the press rod 214, after the steps of disengaging the pair of metallic molds 211 and 212 shown in FIG. 10(c), disposing the base 226 shown in FIG., 10(d), and moving the upper punch die 211 downward. As a result, a further problem exists in that manufacturing efficiency is poor.

SUMMARY OF THE INVENTION

Accordingly, a primary object of the present invention is to provide a nonslip member and a manufacturing method in which any squeezing step is not required.

Another object of the invention is to provide a manufacturing method of a nonslip member superior in manufacturing efficiency.

To accomplish the foregoing objects, there is provided according to the invention a nonslip member in which a large number of nonslip convexes are fixed to an upper surface of a base fabric performing an anchoring action (generally called "anchoring effect"), characterized in that the nonslip convexes are composed of a rubber.

In the manufacturing method of a nonslip member according to the invention, first, an unvulcanized rubber is pressed between a metallic mold having a large number of molding concaves corresponding to the nonslip convexes and a holding plate, and the unvulcanized rubber is semi-vulcanized by heating. After the semi-vulcanization, the holding plate is released and burrs not accommodated in the molding concaves of the metallic mold are removed. Thereafter, a base fabric is laid covering a part to be molded serving as the nonslip convexes. By pressurizing and heating the part to be molded while laying the base fabric and closing the metallic molds, the part to be molded is vulcanized, and the vulcanized nonslip convexes are caused to get in the upper surface of the base fabric performing the anchoring action to be fixed thereto.

In the invention, since the nonslip convexes are not composed of resin but of rubber, by semi-vulcanizing the nonslip convexes, burrs not accommodating in the molding concaves are hardened. As a result, the burrs can be removed and, therefore, the conventional "squeezing" step is not required at all. Furthermore, by composing the nonslip convexes of rubber, hardness of the nonslip convexes can be reduced and gripping characteristic thereof is improved, and therefore it is difficult for the nonslip member to slip even on the slippery smooth floor or road.

Further, when peripheral edge of each nonslip convex is provided with a thin reinforcing part, anchoring force between the nonslip convexes and the base fabric are increased. Furthermore, when the thin reinforcing part is recessed from the upper surface of the base fabric, there is no possibility of losing the advantage of light weight.

In the invention, the "semi-vulcanization" does not mean that an unvulcanized rubber is vulcanized by half or so, but means that a portion of the unvulcanized rubber supplied to the metallic mold is completely or incompletely vulcanized and the remaining portion is left unvulcanized or incompletely vulcanized. In other words, the "semi-vulcanization" means that a portion to be a burr among the unvulcanized rubber supplied to the metallic mold is completely or incompletely vulcanized and a portion filling up the molding concave among the unvulcanized rubber is left unvulcanized or incompletely vulcanized.

Being different depending upon kind and composition of polymer employed, the semi-vulcanization is usually performed by pressurizing and heating the unvulcanized rubber for about 40 sec to 60 sec while keeping the temperature of the metallic mold and the holding plate at 145° C. to 160° C. (preferably at 150° C. to 155° C.) . In such a manufacturing method, the "semi-vulcanization" is an essential requirement because the nonslip convexes are strongly fixed to the base fabric as a result that the molded part is vulcanized after getting in the upper surface of the base fabric performing the anchoring action.

In the invention, the fixation of the rubber forming the nonslip convexes to the base fabric is achieved largely depending on the anchoring action of the upper surface of the base fabric. Accordingly, it is essential that the semi-vulcanized rubber of small fluidity sufficiently gets in very small gaps among the fibers of the base fabric. From such a viewpoint, it is preferable that the principal polymer forming the nonslip convexes is a synthetic rubber of smaller molecular weight than NR (natural rubber). Further, in case of using the nonslip member as shoe sole or the like, it is preferable that BR (butadiene rubber), SBR (styrene-butadiene) or blend of BR and SBR is used as the synthetic rubber.

In the invention, "composed of rubber" means that a rubber has a rubber component of not less than 50 weight % with respect to the entire polymer. The nonslip convexes may be composed of either a foaming material or a non-foaming material. The "principal polymer" means a polymer component of not less than 50 weight % with respect to the entire polymer, and it is preferable to blend a synthetic rubber with NR or to blend BR with IR (isoprene rubber). In the invention, it is also preferable to blend the rubber with a resin such as EVA (ethylene-vinyl acetate copolymer), RB (syndiotactic 1,2-polybutadiene) or polyurethane to which a cross linking agent is added.

In addition, the blend ratio of BR to the entire polymer is preferably about 70 to 95 weight % and, more preferably, about 80 to 90 weight %. Polymer of the remaining portion is preferably NR or IR.

In the manufacturing method of the nonslip member according to the invention, a mounting base, a female mold, and a male mold are prepared. The mounting base is used for laying and mounting a base fabric thereon. The female mold is provided with through holes passing through between two faces of the female mold. The male mold has a large number of punching convexes to be engaged with the through holes.

To manufacture the nonslip member, first, a base fabric is laid covering the mounting base so that the base fabric is disposed between the mounting base and one face of the female mold. In the meantime, a plate-like material to be molded is disposed between another face of the female mold and the male mold. After disposing the base fabric and the plate-like material, the male mold and the female mold are engaged with each other, whereby a large number of small pieces coincident to the shape of each through hole is punched out from the plate-like material before each punching convex is completely engaged with each through holes.

After the punching step, the male mold and the female mold are engaged with each other, and each small piece is pressurized and heated between the punching convexes and the mounting base, whereby a polymer forming the small pieces is bridged and fixed to the base fabric to serve as nonslip convexes.

In the invention, the base fabric and the plate-like material to be molded are disposed along the two faces of the female mold having a large number of through holes, a large number of small pieces are punched out from the plate-like material, and the small pieces are molded and fixed to the base fabric by only one engaging motion. As a result, manufacturing efficiency is improved.

As the "base fabric" used in the invention, any material performing the anchoring action for fixing the nonslip convexes (generally called "anchoring effect") can be preferably used. For example, a material selected from the group comprising woven fabric, knitted fabric and nonwoven fabric can be used as the base fabric.

As the "plate-like material", a rubber not bridged, a material composed of a thermoplastic resin forming a principal polymer or a blend of these materials can be used. As the rubber, BR, SBR, NR, IR or a blend of these rubbers can be used. As the thermoplastic resin, EVA, PE or a blend of these resins can be used. The nonslip convexes fixed to the base fabric may be either a foaming material or a non-foaming material.

As the shape of the nonslip convexes, various shapes such as cylinder, disk, square can be adopted. In addition, any stepped shape may be adopted. In case of adopting a stepped shape, a molding concave corresponding to the nonslip convex is preliminarily formed at the top end of each punching convex of the male mold, and by pressurizing and heating each punched out small piece between the punching convex and the mounting base at the time of fixing to the base fabric, each small piece is molded into a nonslip convex of a shape coincident to the molding concave.

In the invention, in case of forming the nonslip convexes into a stepped shape, it is preferable that the nonslip convexes are cooled keeping the engagement between the male mold and the female mold, after pressurizing and heating each small piece for the molding and fixation. This is because a shape of the molded nonslip convexes is secured by the cooling and it is easy to get a desired shape.

BRIEF DESCRIPTION OF THE DRAWINGS

The present invention will become apparent from the following description of a preferred embodiment with reference to the accompanying drawings. The preferred embodiment and the drawings, however, are just for describing the invention and do not limit the scope of the invention. The scope of the invention is therefore defined just by the appended claims. In the drawings, the same reference numerals are designated to the same or like parts.

FIG. 2 shows a first example of the manufacturing method, and in which

FIG. 3 shows a second example of the manufacturing method, and in which

FIG. 5 shows a third example of the manufacturing method, and in which

FIG. 7(a), FIG. 7(b) and FIG. 7(c) show the fourth example of the manufacturing method, and are schematic sectional views showing the steps until small pieces are punched out in order from the plate-like material to be molded.

FIG. 9 shows the manufacturing method according to the prior art.

DESCRIPTION OF THE PREFERRED EMBODIMENT

Several examples according to the present invention are hereinafter described with reference to the drawings.

First example of the nonslip member

Figure 1A:
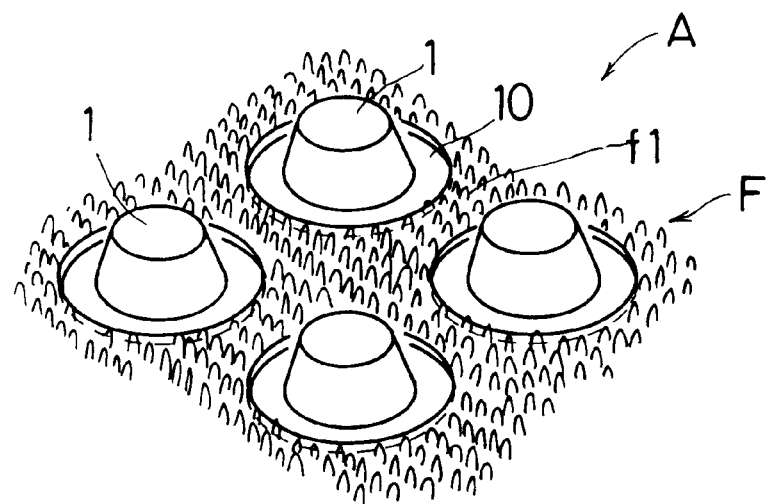
FIG. 1(a) is an enlarged perspective view showing a first example of the nonslip member according to the present invention.

As shown in FIG. 1(a), a nonslip member A comprises a large number of rubber nonslip convexes 1 fixed to an upper surface f1 of the base fabric F. As the base fabric F, woven fabric, knitted fabric and nonwoven fabric are used.

Figure 1B:
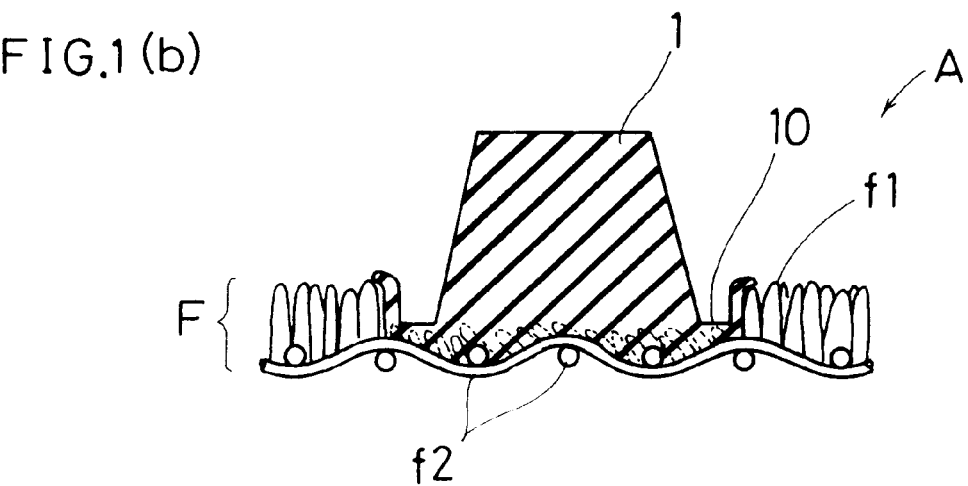
FIG. 1(b) is an enlarged sectional view thereof.

As shown in FIG. 1(b), the nonslip convexes 1 are fixed to the base fabric F in such a manner as to get in from the upper surface f1 performing the anchoring action toward the under surface in the base fabric F. In this respect, it is also preferable that in the nonslip member A, a part of rubber forming each nonslip convex 1 gets in up to the under surface f2 of the base fabric F.

A rubber thin reinforcing part 10 is integrally formed on the peripheral edge of the nonslip convex 1. The thin reinforcing part 10 is pressed on the upper surface f1 of the base fabric F from the upper surface f1 of the base fabric F toward the under surface f2, and is therefore recessed deeper than the level of the upper surface f1 of the base fabric F. The nonslip convex 1 is fixed to the base fabric F by the anchoring action, and the thin reinforcing part 10 increases the fixation area due to the anchoring action, which eventually results in increase of fixing force between the nonslip convex 1 and the base fabric F.

The nonslip member A can be adopted as upper of soccer shoe (the Japanese Patent Publication (examined) Hei 1-19883) or as glove other than the outer sole of shoes. In addition, various shapes can be adopted as that of the nonslip convexes 1.

By the way, as Young's modulus of the elastomer of resin such as polyurethane is generally large as compared with rubber, when using the elastomer as a shoe sole, the shoe sole is easy to slip on the slippery hard and smooth floor or road. On the other hand, since the nonslip convexes of the nonslip member A are made of rubber, the Young's modulus can be smaller and, therefore, gripping characteristic is improved. Since the nonslip convexes are made of rubber, abrasion resistance is also improved.

Manufacturing method

A manufacturing method of the nonslip member A is hereinafter described.

First example of the manufacturing method

Figure 2A:
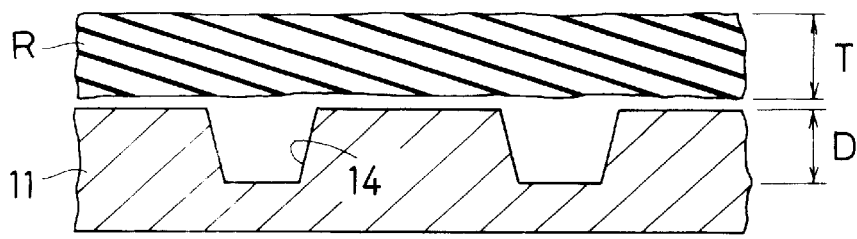
FIG. 2(a) is a sectional view showing a fabric of unvulcanized rubber placed on the first metallic mold.
Figure 2B:
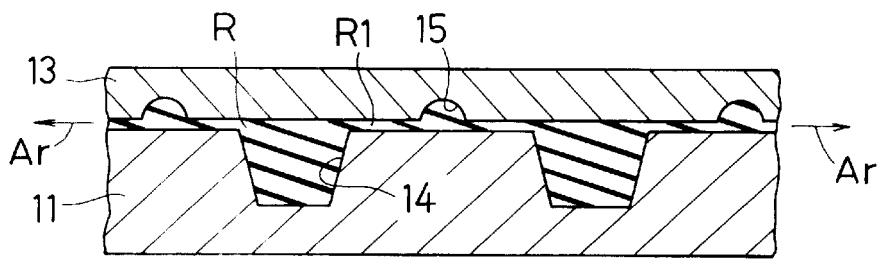
FIG. 2(b) is a sectional view showing the fabric being pressurized and heated.
Figure 2C:
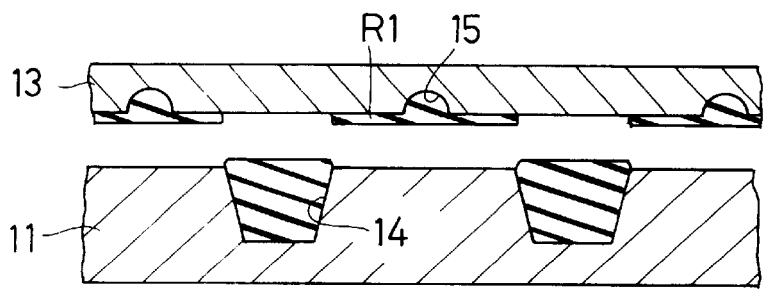
FIG. 2(c) is a sectional view showing the holding plate disengaged.
Figure 2D:
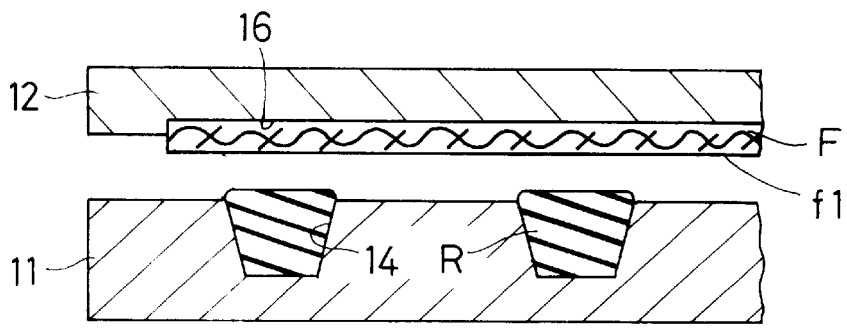
FIG. 2(d) is a sectional view showing a base fabric mounted on the second metallic mold.

In this manufacturing method, the first and second metallic molds 11 and 12 shown in FIG. 2(d) and the holding plate 13 shown in FIG. 2(a) are preliminarily prepared. The first metallic mold 11 shown in FIG. 2(a) has a large number of molding concaves 14 corresponding to the nonslip convexes 1 (FIG. 1). The holding plate 13 in FIG. 2(b) has escaping recesses 15 for escaping the unvulcanized rubber R at the time of pressurizing and heating the unvulcanized rubber R between itself and the first metallic mold 11. The escaping recesses 15 are formed at portions not facing the molding concaves 14.

On the second metallic mold 12 in FIG. 2(d), a fabric mounting recess 16 is formed to have a depth corresponding to about ⅓ to ½ of the thickness of the base fabric F.

The holding plate 13 and the second metallic mold 12 are rotatably mounted on left and right ends of the first metallic mold 11 respectively by hinges not illustrated so as to be alternately opened and closed by rotation.

To manufacture the nonslip member, first, as shown in FIG. 2(a), the unvulcanized rubber R blended to be a predetermined blend ratio is placed on the first metallic mold 11. A thickness T of the fabric of the unvulcanized rubber R is established to be a little larger than the depth D of the molding concaves 14.

Then, by pressing the holding plate 13 on the first metallic mold 11 from above the fabric of the unvulcanized rubber R as shown in FIG. 2(b), the molding concaves 14 of the first metallic mold 11 are filled with the unvulcanized rubber R. At this time, a part of the fabric of the unvulcanized rubber R escapes into the escaping recesses 15, and another part escapes out of a gap between the first metallic mold 11 and the holding plate 13 in the direction of the arrow Ar.

Subsequently, by pressurizing the unvulcanized rubber R between the first metallic mold 11 and the holding plate 13 and keeping the first metallic mold 11 and the holding plate 13 at a temperature of about 160° C., the unvulcanized rubber R is heated for about one minute. In this manner, the unvulcanized rubber R is semi-vulcanized. More specifically, the vulcanization of the portions to be a burr R1 is accelerated, while the unvulcanized rubber R in the molding concaves 14 is not much vulcanized.

The burr R1 held between the first metallic mold 11 and the holding plate 13 becomes like a thin skin, but it is shown thicker than actual condition thereof in FIG. 2 to understand easily the existence of the burr R1.

After the semi-vulcanization, as shown in FIG. 2(c), the holding plate 13 is opened, and the burr R1 stuck to the holding plate 13 or to the first metallic mold 11 is removed together with the portions remaining in the escaping recesses 15 by peeling it off the holding plate 13 or the metallic mold 11. In this connection, the burr R1 means a thin portion not accommodated in the molding concave 14.

Figure 2E:
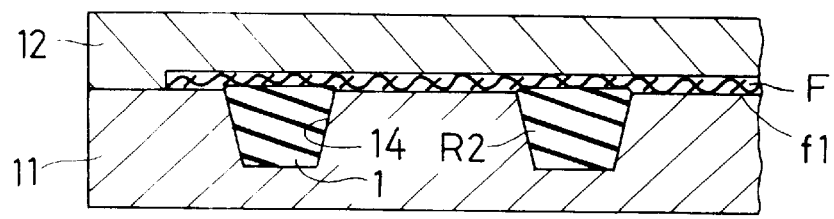
FIG. 2(e) is a sectional view showing the step of fixing the nonslip convexes to the base fabric.

After the semi-vulcanization, as shown in FIG. 2(d), the base fabric F is mounted on the fabric mounting recess 16 of the second metallic mold 12. At this time, the upper surface f1 of the base fabric F is faced to the first metallic mold Subsequently, as shown in FIG. 2(e), the base fabric F is laid covering the molded part R2 to be formed into the nonslip convex 1(FIG. 1). Keeping the base fabric F laid on, the molding concave 14 of the first metallic mold 11 is closed with the second metallic mold 12 (i.e., both metallic molds 11 and 12 are closed), whereby the part R2 to be molded is pressurized and heated at 160° C. for several minutes for vulcanization. In this manner, the vulcanized nonslip convex 1 comes to get in the upper surface f1 of the base fabric F performing the anchoring action.

Thereafter, by releasing the molds, a predetermined nonslip member is obtained. Thus, in this manufacturing method, any "squeezing step" is not required.

Second example of the manufacturing method

FIGS. 3(a) to 3(e) show a second example of the manufacturing method.

Figure 3A:
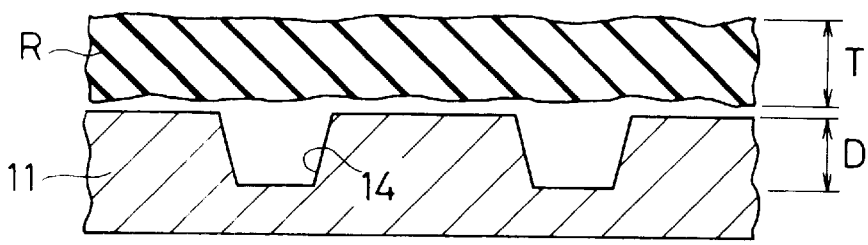
FIG. 3(a) is a sectional view showing a fabric of unvulcanized rubber placed on the first metallic mold.
Figure 3B:
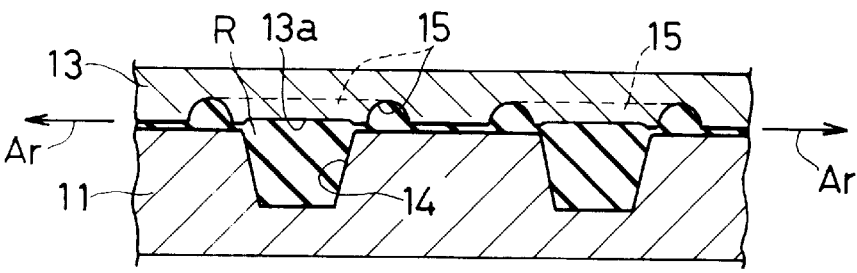
FIG. 3(b) is a sectional view showing the fabric being pressurized and heated.
Figure 3C:
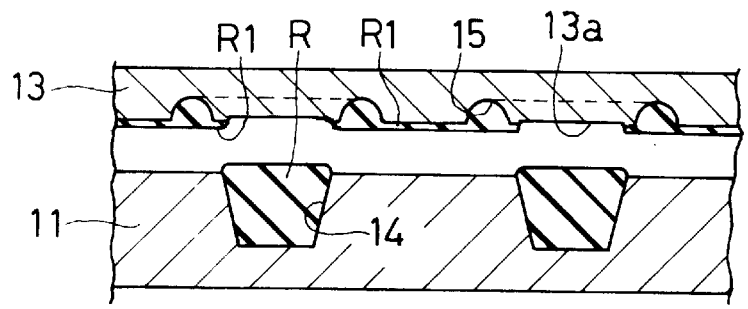
FIG. 3(c) is a sectional view showing the holding plate disengaged.
Figure 3D:
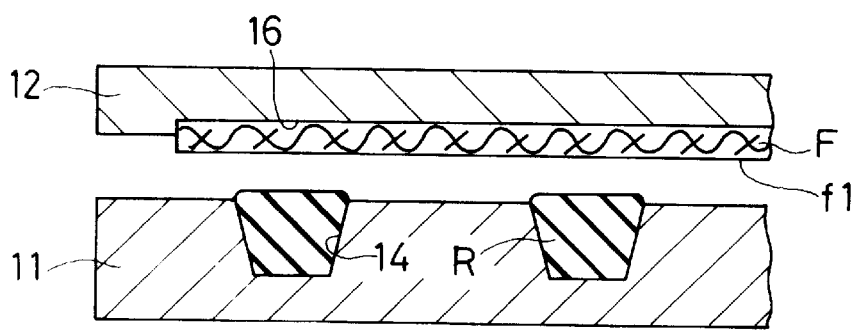
FIG. 3(d) is a sectional view showing a base fabric mounted on the second metallic mold.
Figure 3E:
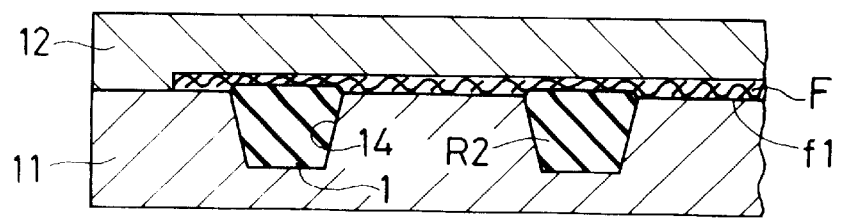
FIG. 3(e) is a sectional view showing the step of fixing the nonslip convexes to the base fabric.

In this example, as shown in FIG. 3(b), a raising concave 13a is formed on the holding plate 13 at a position facing the molding concave 14. In the raising concave 13a, as shown in FIG. 3(c), the unvulcanized rubber R or the semi-vulcanized rubber R is raised a little, and at the time of closing the two metallic molds 11 and 12, the unvulcanized rubber R is brought in contact with the base fabric F by a large pressure.

In this example, as shown by the broken line in FIG. 3(b), an escaping recess 15 is formed into an annular groove. This escaping recess 15 has an inner periphery larger than an outer periphery of the molding concave 14, and is located at a portion not facing the molding concave 14 in the holding plate 13, though the escaping recess 15 is located in the vicinity of the portion facing the molding concave 14 in the holding plate 13. In this example, as a result of providing such escaping recesses 15, the burr R1 can be easily removed or cut out by a shearing force at the time of opening the holding plate 13 in FIG. 3(c).

The other construction and method of the second example is same as the foregoing first example, and same reference numerals are designated to the same or like parts, and further description is omitted herein.

Figure 4:
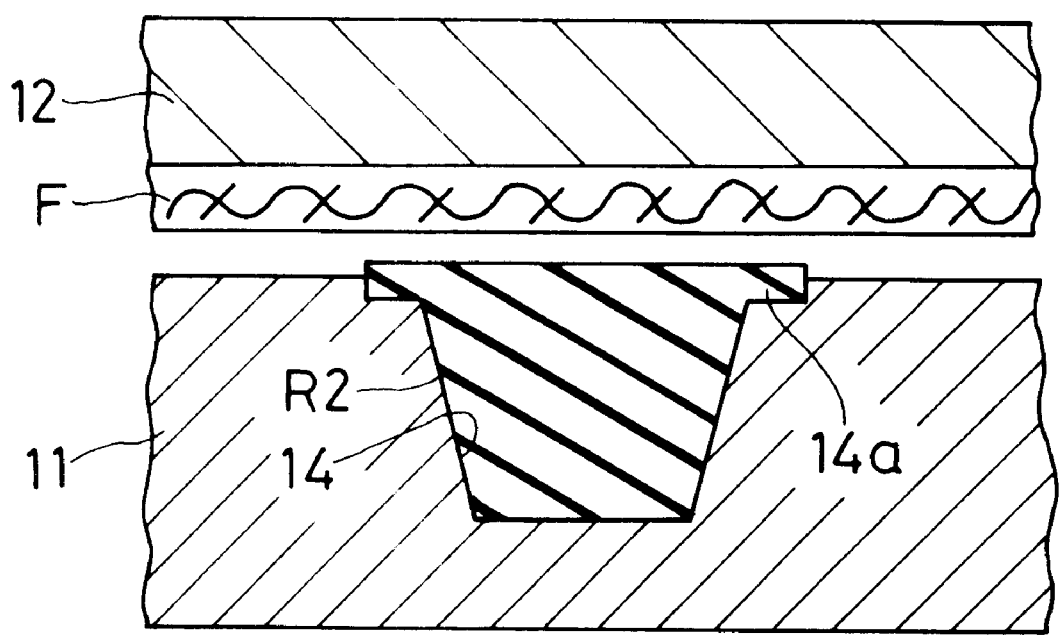
FIG. 4 is a sectional view showing another example of the first metallic mold.

In this example, by providing a peripheral edge groove 14a on the molding concave 14 as shown in FIG. 4, the thin reinforcing part 10 in FIG. 1(b) can be formed.

Third example of the manufacturing method

Figure 5A:
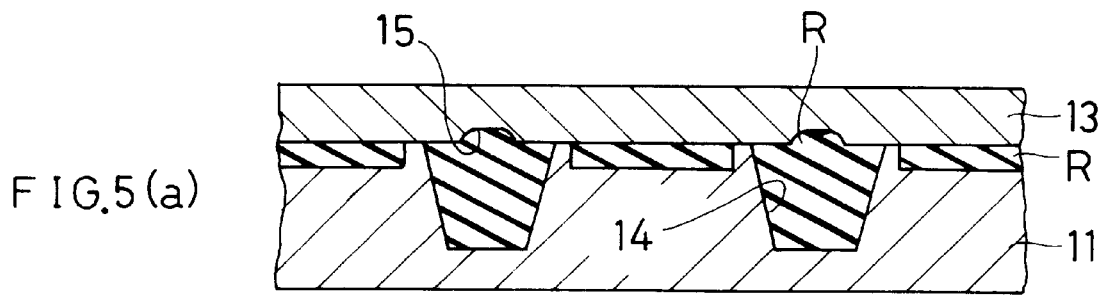
FIG. 5(a) is a sectional view showing the fabric being pressurized and heated.
Figure 5B:
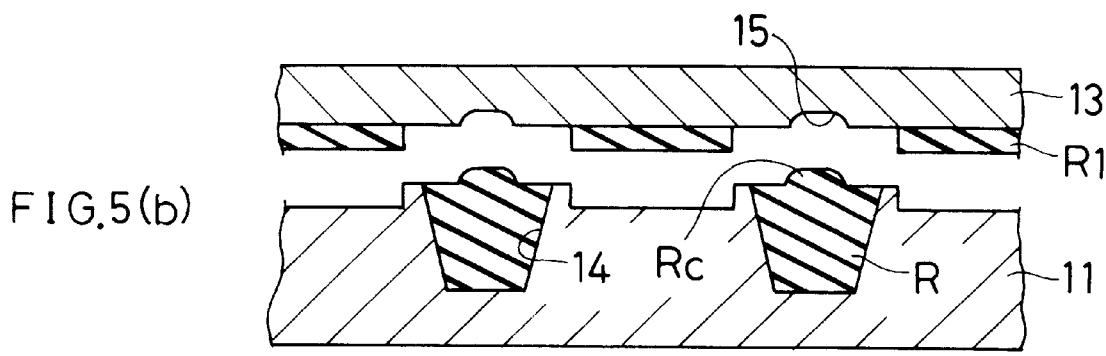
FIG. 5(b) is a sectional view showing the holding plate disengaged.
Figure 5C:
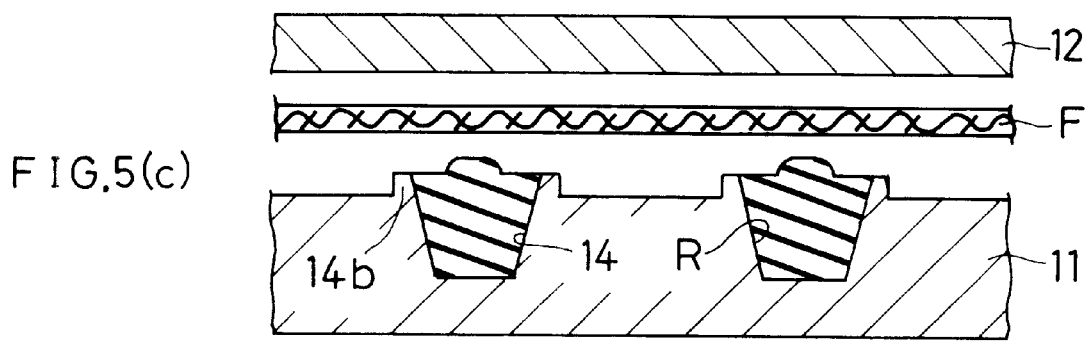
FIG. 5(c) is a sectional view showing a base fabric mounted on the second metallic mold.
Figure 5D:
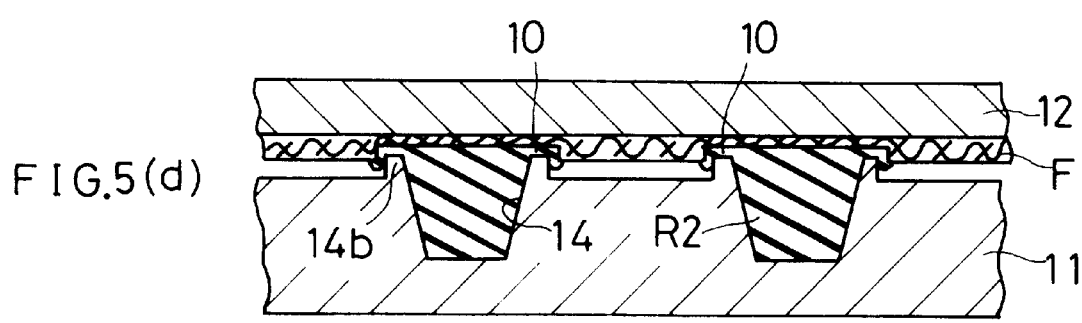
FIG. 5(d) is a sectional view showing the step of fixing the nonslip convexes to the base fabric.

The thin reinforcing part 10 in FIG. 1 can be also formed by forming the escaping recess 15 at the position facing the molding concave 14 in the holding plate 13, as shown in FIGS. 5(a) and (b), and forming a protruding part 14b on the outer periphery of the molding concave 14 in the first metallic mold 11, as shown in FIGS. 5(c) and (d). In case of the example shown in FIG. 5, the semi-vulcanized rubber Rc escaped into the escaping recess 15 in FIG. 5(b) is pressurized by the second metallic mold 12 and collapsed as shown in FIG. 5(d), whereby the thin reinforcing part 10 is formed.

It is preferable that a surface treatment is preliminarily applied to the upper surface f1 of the base fabric F in FIG. 2(d). For example, it is preferred that, before molding, the upper surface f1 is impregnated or coated with a primer adopting a base material of the unvulcanized rubber R as a solvent (such as toluene, acetone, MEK).

Second example of the nonslip member

Figure 8A:
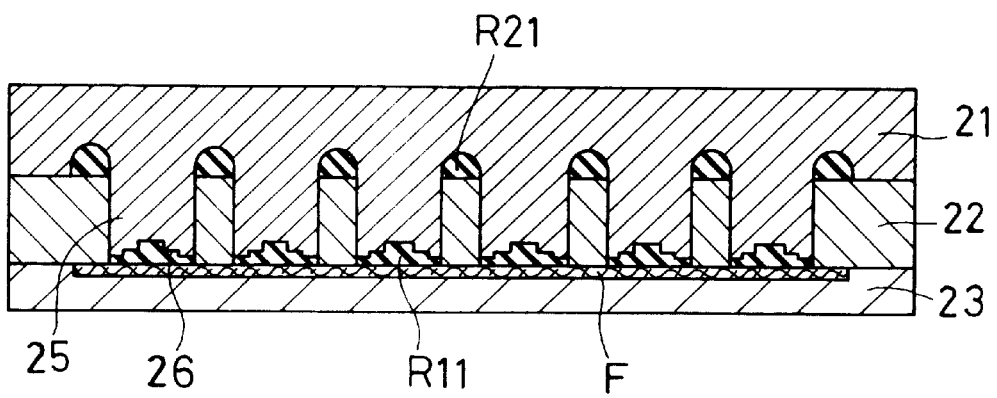
FIG. 8(a), FIG. 8(b) and FIG. 8(c) are schematic sectional views showing the steps in order from molding the small pieces to fixing them to the base fabric.
Figure 8B:
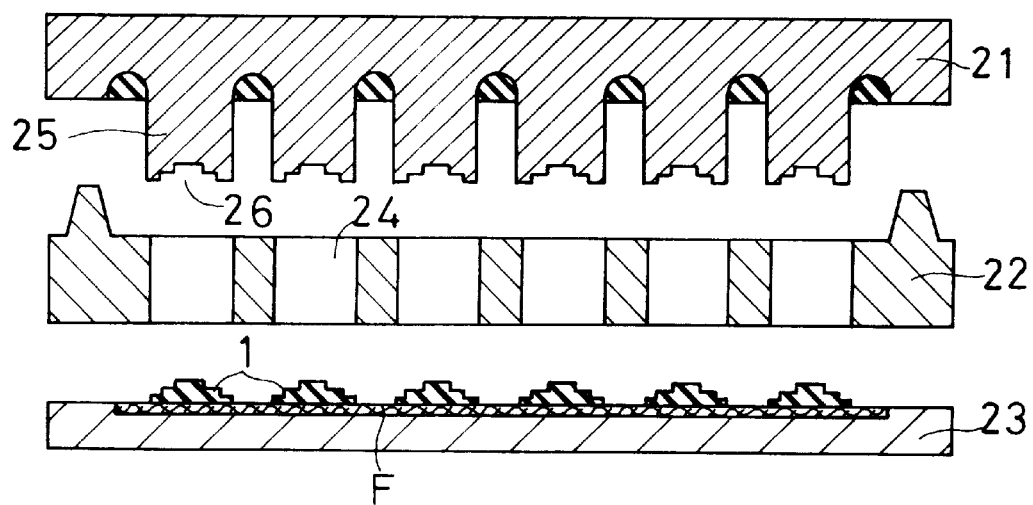
Figure 8C:
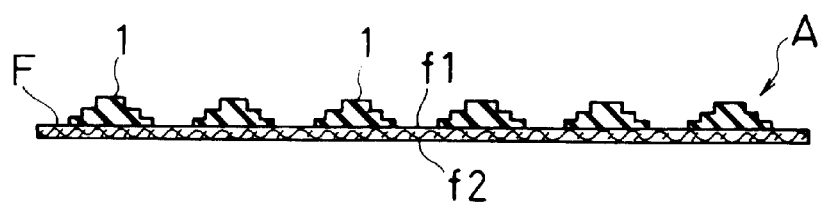
Figure 9A:
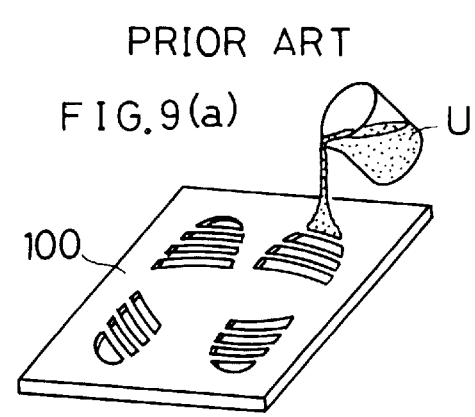
FIG. 9(a) is a perspective view showing the step of injecting the urethane resin.
Figure 9B:
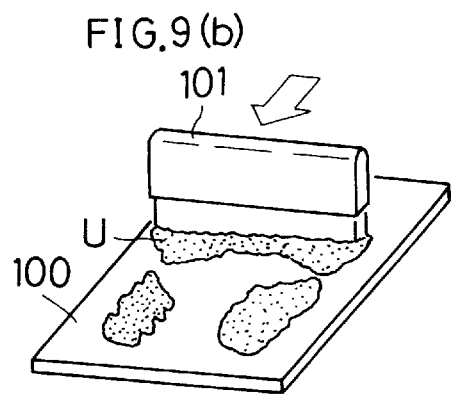
FIG. 9(b) is a perspective view showing the "squeezing" step.
Figure 9C:
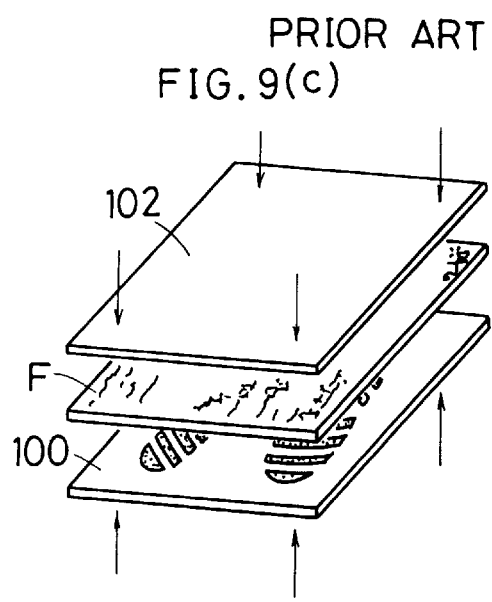
FIG. 9(c) is a perspective view showing the heating step.
Figure 9D:
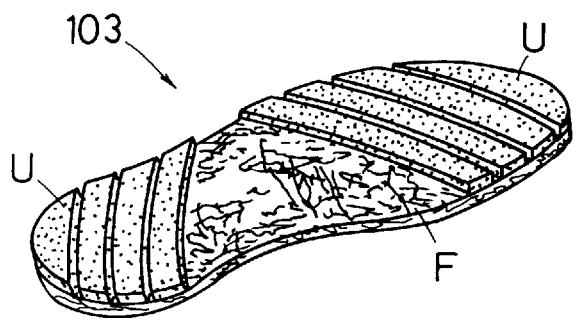
FIG. 9(d) is a perspective view showing nonslip member.
Figure 10A:
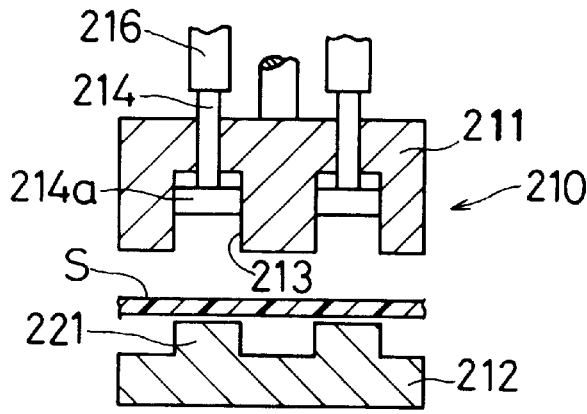
FIG. 10(a), FIG. 10(b), FIG. 10(c), FIG. 10(d) and FIG. 10(e) are schematic sectional views showing the manufacturing method according to the prior art in order of the steps.
Figure 10B:
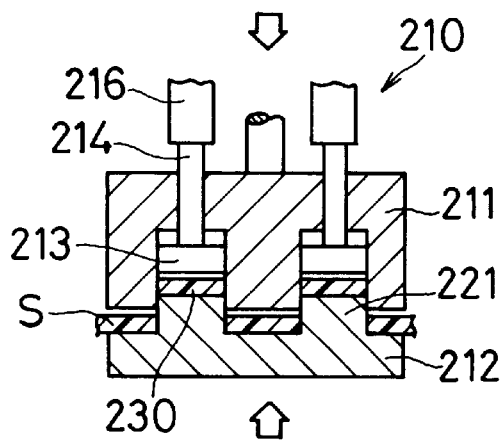
Figure 10C:
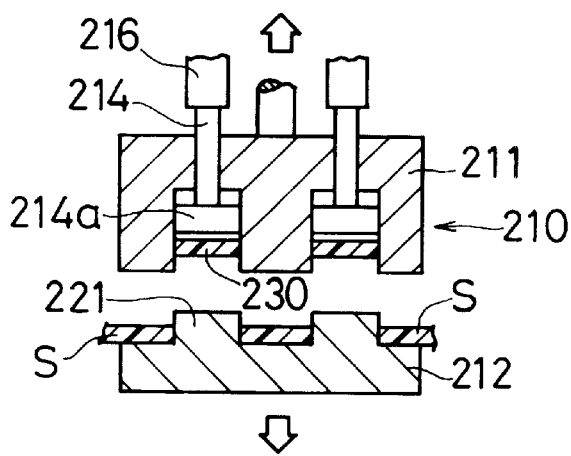
Figure 10D:
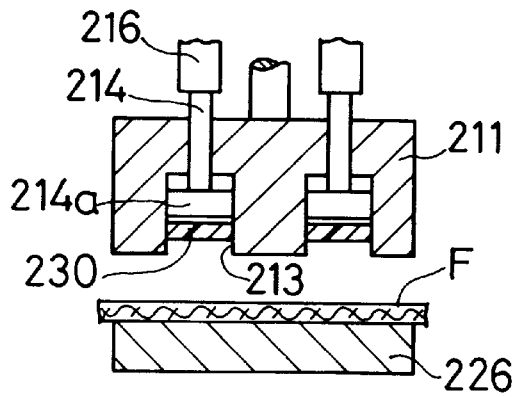
Figure 10E:
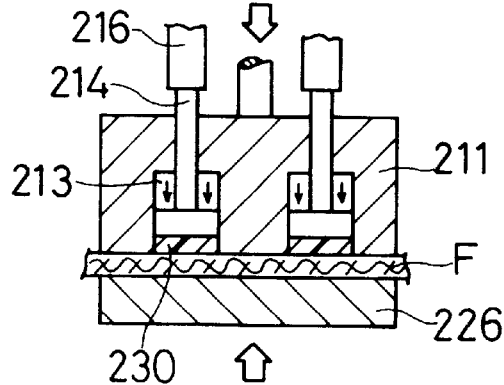

As shown in FIG. 8(c), the nonslip member A comprises a large number of rubber nonslip convexes 1 fixed to the upper surface f1 of the base fabric F.

Figure 6A:
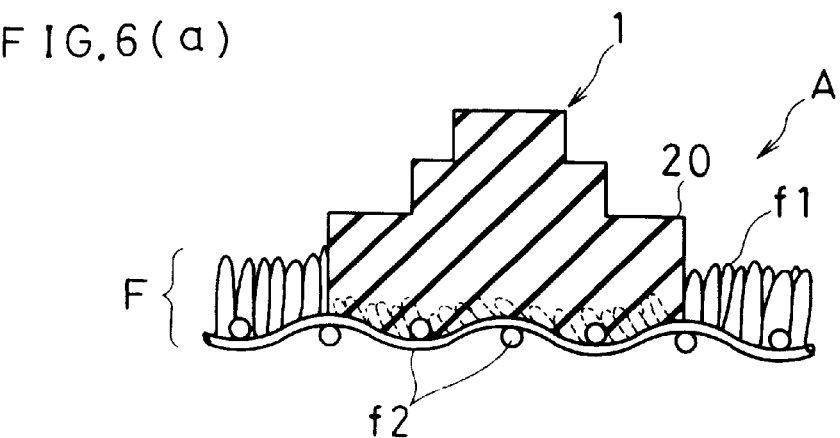
FIG. 6(a) is an enlarged sectional view showing a second example of the nonslip member according to the invention.

As shown in FIG. 6(a), the nonslip convexes 1 are fixed to the base fabric F in such a manner as to get in the under surface from the upper surface f1 performing an anchoring action in the base fabric F. In addition, a part of the rubber forming the nonslip member A may get in up to the under surface f2 of the base fabric F. The nonslip convexes in this example is formed to have steps 20.

Fourth example of the manufacturing method

A further manufacturing method of the nonslip member is hereinafter described.

Figure 6B:
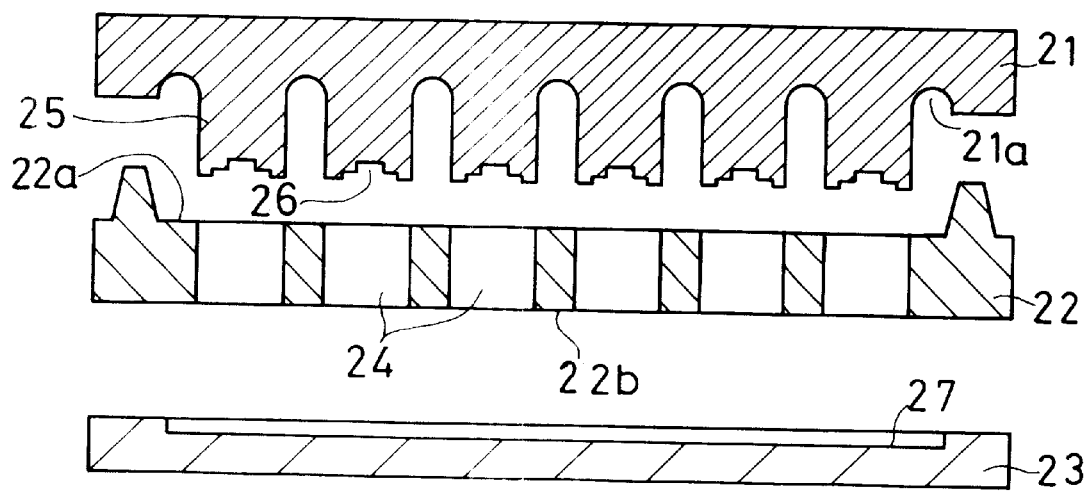
FIG. 6(b) is a schematic sectional view showing the metallic mold used in a fourth example of the manufacturing method.

In this manufacturing method, a male mold 21, a female mole 22 and a mounting base 23 shown in FIG. 6(b) are preliminarily prepared. The mounting base 23 is used to mount and fix the base fabric F (FIG. 7) thereon. A large number of through holes are formed through the female mold 22. The through holes 24 pass through between the upper face 22a and the lower face 22b. The male mold 21 has a large number of punching convexes 25. Each punching convex 25 is engaged with each through holes 24. In this example, on each punching convex, a molding concave 26 shaped corresponding to the nonslip concave 1 is formed at the top end of the punching convex 25.

The female mold 21 is provided with escaping parts 21a for escaping the excessive portion of the material not bridged produced at the time of molding. It is preferable that tolerance in engagement between the through hole 24 and the punching convex 25 is set to be a clearance not larger than 0.1 mm.

To manufacture the nonslip member, first, as shown in FIG. 7(a), the base fabric F is laid covering a mounting recess 27 of the mounting base 23. Then, as shown in FIG. 7(b), by placing the female mold 22 on the base fabric F, the base fabric F is disposed between the upper face of the mounting base 23 and the lower face (one side) 22b of the female mold 22. Subsequently, a plate-like material R0 to be molded is placed on the female mold 22, and the male mold 21 is further placed on the plate-like material R0. In this manner, the plate-like material R0 is disposed between the upper face (another side) 22a of the female mold 22 and the male mold 21.

After disposing the base fabric F and the plate-like material R0, as shown in FIG. 7(c), by moving down the male mold 21 and engaging the male mold 21 and the female mold 22 with each other, a large number of small pieces R11 coincident to the shape of each through hole 24 is punched out from the plate-like material R0, before punching convex 25 is completely engaged with each through hole 24. At this time, the excessive portion of the material not bridged escapes into the escaping parts 21a.

As shown in FIG. 8(a), following the mentioned punching step, the male mold 21 and the female mold 22 are completely engaged with each other. After the engagement, each small piece R11 is heated and pressurized between the punching convexes 25 and the mounting base 23, and is formed into a nonslip convex 1 (FIG. 8(c)) coincident to the shape of each molding concave 26. At the same time, as a result of pressurization and heating, a polymer is bridged and fixed to the base fabric F to serve as the nonslip convexes 1.

In addition, at the time of the molding and fixation, the pressure is set to more or less 150 kg/cm² at a temperature of 130° C. to 150° C., and each small piece R11 is pressurized and heated for 3 to 5 min.

Thereafter, by cooling the male mold 21, female mold 22 and the mounting base 23, the nonslip convexes 1 are forcedly cooled to secure a shape thereof. After the cooling, as shown in FIG. 8(b), by opening each metallic mold 21 to 23, a nonslip member A shown in FIG. 8(c) is obtained.

In addition, in the cooling step, the pressure is set to more or less 150 kg/cm² at 10° C. to 20° C., and each nonslip convex 1 is forcedly cooled for 3 to 5 min.

Modification

Several examples have been described so far with reference to the drawings, and it will be obvious for persons skilled in the art to make various changes and modifications without departing from the spirit and scope of the invention.

For example, it is not always necessary to form the nonslip convexes 1 in FIGS. 1 and 6 into a shape of truncated cone, but they may be formed into a shape of prism. Further, it is not always necessary for the nonslip convexes 1 to have the reinforcing parts 10 or steps 20. The manufactured nonslip member A can be used also as an upper of shoe other than as outsole. Heating temperature, heating time and pressure at the time of applying a pressure may be changed according to kind of rubber and base fabric.

Further, it is not always necessary for the mounting base 23 in FIG. 7(a) to have the mounting recess 27, and the base fabric F may be secured to the mounting base 23 with pin. The base fabric F may comprise a sheet of two layers.

Consequently, it is to be understood that the mentioned changes and modifications fall within the scope of the invention to be determined by the appended claims.

What is claimed is:

1. A fabric having a nonslip surface comprising:

a base fabric having a first surface and a second surface, wherein the base fabric is a fabric selected from a group consisting of woven fabric, knitted fabric and nonwoven fabric a pattern of a plurality of vulcanized rubber non-slip protuberances projecting from the first surface and affixed thereto and embedded in the base fabric, wherein each of the vulcanized rubber non-slip protuberances further comprises a peripheral vulcanized rubber rim surrounding the protuberance that is integrally formed therewith, and which is also affixed to the first surface and embedded in the base fabric.

2. A fabric having a nonslip surface comprising:

a base fabric having a first surface and a second surface, wherein the base fabric is a fabric selected from a group consisting of woven fabric, knitted fabric and nonwoven fabric a pattern of a plurality of vulcanized rubber non-slip protuberances projecting from the first surface and affixed thereto and embedded in the base fabric, wherein the vulcanized rubber comprises a butadiene rubber or a styrene butadiene rubber.

3. The fabric of claim 2, wherein the vulcanized rubber is about 70% to 95 weight % butadiene rubber.

* * * * *

UNITED STATES PATENT AND TRADEMARK OFFICE
CERTIFICATE OF CORRECTION

PATENT NO. : 6,255,235 B1  
DATED : July 3, 2001  
INVENTOR(S) : Hiraoka et al.

Page 1 of 1

It is certified that error appears in the above-identified patent and that said Letters Patent is hereby corrected as shown below:

<u>Title page,</u>
The inventors are Keiji Hiraoka and Tomohiro Hayashi. Delete "Masanobu Inohara" as an inventor of the claimed invention.

Signed and Sealed this

First Day of January, 2002

*Attest:*

*Attesting Officer*

JAMES E. ROGAN
*Director of the United States Patent and Trademark Office*